United States Defensive Publication [19] (H) [11] T958,007

Roberts [43] May 3, 1977

[54] PROCESS FOR SPINNING ACRYLIC FIBERS

[75] Inventor: Winston James Roberts, Waynesboro, Va.

[73] Assignee: E. I. Du Pont de Nemours and Company, Wilmington, Del.

[21] Appl. No.: 696,914

[22] Filed: June 17, 1976

[51] Int. Cl.[2] ..... D01F 6/18

[52] U.S. Cl. ..... 264/210 F; 264/206

[57] ABSTRACT

Fibers of a polymer containing at least 40% by weight of acrylonitrile units, at least 15% by weight of vinyl chloride units and at least 1% by weight of units of an ethylenically unsaturated sulfonate salt compound which have improved dye yield and luster stability are prepared by dry-spinning fibers of the polymer in an organic solvent and wash-drawing the fibers at a draw ratio of at least 2.2X in an aqueous bath maintained at an elevated temperature, thereby reducing the solvent content of the fiber to less than 3.5% by weight of the fiber. The wash-draw step may be carried out in one or more stages and preferably in at least two stages, the first of which involves a draw of 1.15–1.5X at 40°–60° C. Drying is preferably carried out by subjecting relatively wet fibers (80% moisture) to a high temperature (about 150° C).

No Claims, No Sheets Drawing,

23 Pages Specification

The file of this unexamined application may be inspected and copies thereof may be purchased (849 O.G. 1221, Apr. 9, 1968).